UNITED STATES PATENT OFFICE.

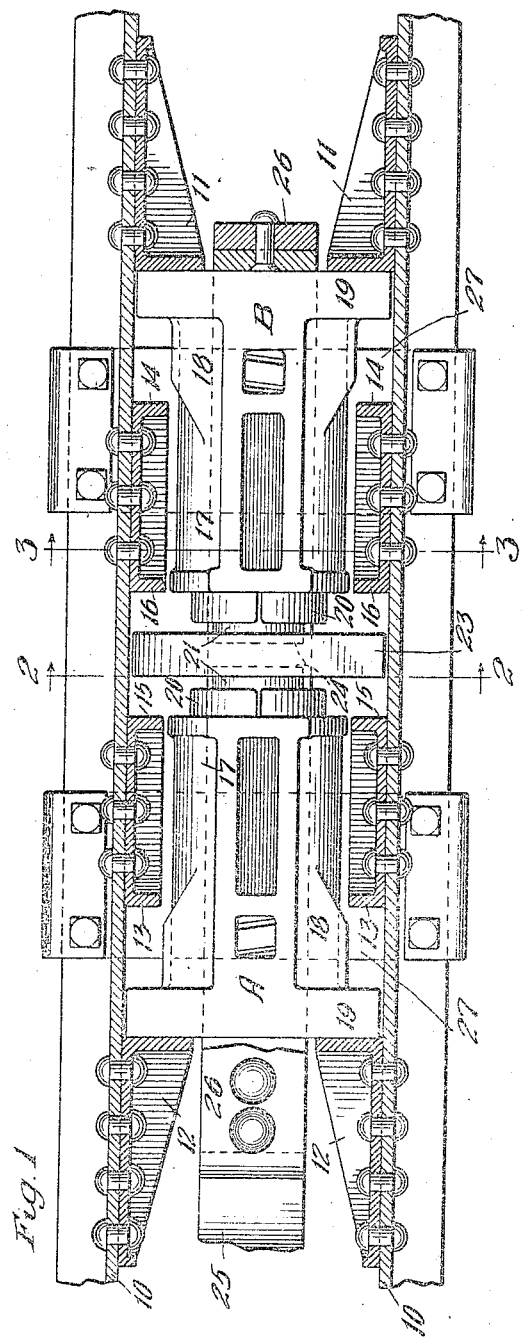
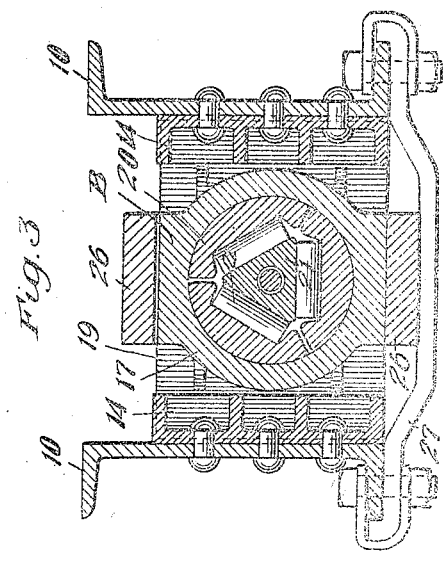
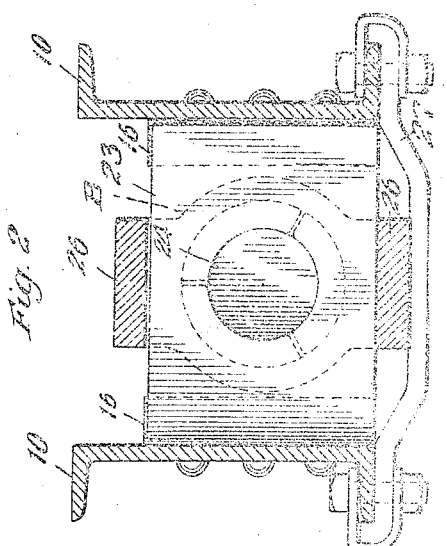

JOHN F. O'CONNOR, OF CHICAGO, ILLINOIS, ASSIGNOR TO WILLIAM H. MINER, OF CHAZY, NEW YORK.

TANDEM FRICTION-GEAR.

1,256,819.   Specification of Letters Patent.   Patented Feb. 19, 1918.

Application filed July 13, 1916. Serial No. 109,007.

*To all whom it may concern:*

Be it known that I, JOHN F. O'CONNOR, a citizen of the United States, residing at Chicago, in the county of Cook and State of Illinois, have invented a certain new and useful Improvement in Tandem Friction-Gears, of which the following is a full, clear, concise, and exact description, reference being had to the accompanying drawings, forming a part of this specification.

This invention relates to improvements in tandem friction gears.

The object of the invention is to provide a tandem arranged friction gear of high capacity and wherein the parts are relatively inexpensive to manufacture and simply arranged.

In the drawing forming a part of this specification, Figure 1 is a longitudinal, horizontal section of a draft rigging showing my improvements in connection therewith. Figs. 2 and 3 are transverse, vertical sectional views taken on the lines 2—2 and 3—3 respectively of Fig. 1.

In said drawing, 10—10 denote channel shaped center sills or draft members, to the inner faces of which are secured rear main stops 11—11, front main stops 12—12, front limiting stops 13—13, rear limiting stops 14—14, and intermediate limiting stops 15 and 16. The limiting stops 13, 14, 15 and 16 are preferably formed by separate stop lugs riveted to the sills and so spaced as to permit 4" movement of the draw bar. The shock absorbing mechanism proper, as shown, comprises a front friction gear, designated generally by the reference A and a rear friction gear designated generally by the reference B. The friction gears A and B are of similar construction and each comprises a friction cylinder portion 17, spring cage 18 and integral end follower 19. Coöperable with the friction cylinder 17 are friction shoes 20 and wedge 21, there being a plurality of anti-friction rollers 22 interposed between the friction shoes and wedge, as clearly indicated in Fig. 3. The friction gears A and B are arranged with their friction mechanisms at the center, that is, with the wedges 21 opposite each other. Interposed between the wedges is a central or floating follower 23 and in order to insure proper alinement of the friction gears, said follower 23 is preferably recessed on each side as indicated at 24, for a short distance, to receive the corresponding wedge 21. In this manner, the wedges 21 will always be held in alinement and thus insure the simultaneous and proper actuation of the friction mechanism. The two gears A and B are operatively connected to the draw bar 25 by means of a yoke 26 and all the parts are suitably supported by means of saddle plates 27—27 detachably bolted to the lower flanges of the sills.

In operation, upon inward movement of the draw bar, the rear friction gear B will be held stationary and the front gear A will be moved until the follower 19 thereof engages the front limiting stops 13. This movement of the front gear A will actuate both sets of friction mechanisms and the intermediate or floating follower 23 will be brought to rest by engagement with the limiting stops 16. Under draft, the front friction gear A will remain stationary and the rear gear B moved forwardly until the follower 19 thereof engages the limiting stops 14.

I claim:

1. In a draft rigging, the combination with two friction gears, each comprising a friction shell, friction shoes, and a wedge, said friction gears being arranged end to end with the wedges opposite each other, of a follower interposed between the wedges, said follower having recesses within which the wedges are seated to thereby maintain the friction mechanisms in proper alinement.

2. In a draft rigging, the combination with draft sills having stops thereon, of a pair of friction gears, each gear having a wedge member and the gears being arranged end to end with the wedges opposite each other, a follower interposed between said wedges, and coöperating engaging means on said wedges and follower for maintaining the friction gears in proper alinement.

I witness that I claim the foregoing I have hereunto subscribed my name this 11th day of July, 1916.

JOHN F. O'CONNOR.

Witnesses:
ELIZABETH M. BRITT,
GOLDIE A. BISHOP.